US012496845B2

(12) United States Patent
Veis et al.

(10) Patent No.: US 12,496,845 B2
(45) Date of Patent: Dec. 16, 2025

(54) PRINT AGENT DRYING APPARATUS

(71) Applicant: HP SCITEX LTD., Netanya (IL)

(72) Inventors: Alex Veis, Netanya (IL); Yubai Bi, San Diego, CA (US); Eyal Kotik, Netanya (IL); Amir Hesed, Netanya (IL)

(73) Assignee: HP SCITEX LTD., Netanya (IL)

( * ) Notice: Subject to any disclaimer, the term of this patent is extended or adjusted under 35 U.S.C. 154(b) by 209 days.

(21) Appl. No.: 17/311,884

(22) PCT Filed: Apr. 30, 2019

(86) PCT No.: PCT/US2019/029935
§ 371 (c)(1),
(2) Date: Jun. 8, 2021

(87) PCT Pub. No.: WO2020/222806
PCT Pub. Date: Nov. 5, 2020

(65) Prior Publication Data
US 2022/0048302 A1 Feb. 17, 2022

(51) Int. Cl.
*B41J 3/407* (2006.01)
*B41F 23/04* (2006.01)
*B41L 23/20* (2006.01)
*F26B 21/10* (2006.01)

(52) U.S. Cl.
CPC .......... *B41L 23/20* (2013.01); *B41F 23/0409* (2013.01); *B41F 23/0426* (2013.01); *F26B 21/10* (2013.01)

(58) Field of Classification Search
CPC .............. B41M 5/0011; B41M 5/0041; B41M 5/0047; B41J 2/435; B41J 2/447; B41J 2/45; B41J 2/475; B41J 2/4753; B41J 3/407; B41J 3/4078
See application file for complete search history.

(56) References Cited

U.S. PATENT DOCUMENTS

| | | | |
|---|---|---|---|
| 4,551,925 | A | 11/1985 | Ericsson |
| 6,766,593 | B2 | 7/2004 | Laudat et al. |
| 8,707,578 | B2 | 4/2014 | Jung et al. |

(Continued)

FOREIGN PATENT DOCUMENTS

| | | | | |
|---|---|---|---|---|
| CN | 103287141 A * | 9/2013 | ............ B41J 2/2114 |
| CN | 103568543 A | 2/2014 | |

(Continued)

OTHER PUBLICATIONS

Mochizuki, MachineTranslationofJP-2013181163-A, 2013 (Year: 2013).*
Kamada, MachineTranslationofCN-103287141-A, 2013 (Year: 2013).*

*Primary Examiner* — Scott A Richmond
(74) *Attorney, Agent, or Firm* — Jordan IP Law, LLC

(57) ABSTRACT

A method of drying print agent is disclosed. The method comprises blowing hot air onto an absorbent printable medium that bears water- and/or solvent-based print agent to reduce the viscosity of the print agent and to promote absorption of at least some water and/or solvent in the print agent by the printable medium; and, subsequent to the blowing of hot air, irradiating the printable medium with ultraviolet radiation to dry the unabsorbed portion of print agent on the printable medium. A printer ink drying apparatus and a print apparatus are also disclosed.

15 Claims, 3 Drawing Sheets

(56) References Cited

U.S. PATENT DOCUMENTS

| | | | | |
|---|---|---|---|---|
| 10,442,183 | B2 | 10/2019 | Franz et al. | |
| 2011/0205282 | A1* | 8/2011 | Houjou | B41J 11/002 347/102 |
| 2018/0282559 | A1* | 10/2018 | Umebayashi | C09D 11/322 |

FOREIGN PATENT DOCUMENTS

| | | | | |
|---|---|---|---|---|
| CN | 205416736 | U | 8/2016 | |
| CN | 106671566 | A | 5/2017 | |
| CN | 207241152 | U | 4/2018 | |
| CN | 108583002 | A | 9/2018 | |
| CN | 108973318 | A | 12/2018 | |
| DE | 4139120 | A1 | 6/1992 | |
| EP | 0080448 | B1 | 9/1987 | |
| EP | 0349507 | A1 | 1/1990 | |
| JP | 2005-001303 | A | 1/2005 | |
| JP | 2007-245374 | A | 9/2007 | |
| JP | 2010-042542 | A | 2/2010 | |
| JP | 2011-168021 | A | 9/2011 | |
| JP | 2013181163 | A * | 9/2013 | C09D 11/38 |
| JP | 2015-168114 | A | 9/2015 | |
| JP | 2016-022682 | A | 2/2016 | |
| JP | 2018-044270 | A | 3/2018 | |
| JP | 2018-083352 | A | 5/2018 | |
| WO | WO-2002025193 | A | 3/2002 | |
| WO | WO-2011138350 | A1 | 11/2011 | |
| WO | 2017/135425 | A1 | 8/2017 | |
| WO | WO-2017185122 | A1 | 11/2017 | |
| WO | 2019/059948 | A1 | 3/2019 | |

* cited by examiner

PRINT AGENT DRYING APPARATUS

BACKGROUND

In printing operations, print agent, such as ink, may be deposited onto a printable substrate such as paper or cardboard. Before the printed substrate is rolled or stacked, the print agent printed onto the substrate is dried. Drying of the printed print agent is performed in such a way that the quality of the print agent is not adversely affected.

BRIEF DESCRIPTION OF DRAWINGS

Examples will now be described, by way of non-limiting example, with reference to the accompanying drawings, in which.

DETAILED DESCRIPTION

When print agent is deposited onto a printable substrate during a printing operation, the substrate may be subjected to a drying process to dry the print agent printed thereon. In some printing systems, print agent printed onto a substrate may be dried completely before the printed substrate is substrate is removed from the printing press. While drying the printed substrate as quickly as possible may lead to the ability to generate a greater print volume from the printing press, rapid drying of some printer inks may adversely affect print quality. Conversely, some printing systems use drying techniques that slowly dry the print agent printed onto the substrate. However, apparatuses that can achieve such slow drying may be physical large (e.g. with long conveying systems) and may, therefore, be expensive to manufacture and maintain. Furthermore, the energy consumption of drying systems used in the above-mentioned quick-drying and slow-drying techniques may be significant.

Examples disclosed herein make use of a combination of drying techniques in a two-stage process which can be achieved relatively quickly compared to the techniques discussed above, and using an apparatus having a relatively small footprint.

Figure 1:
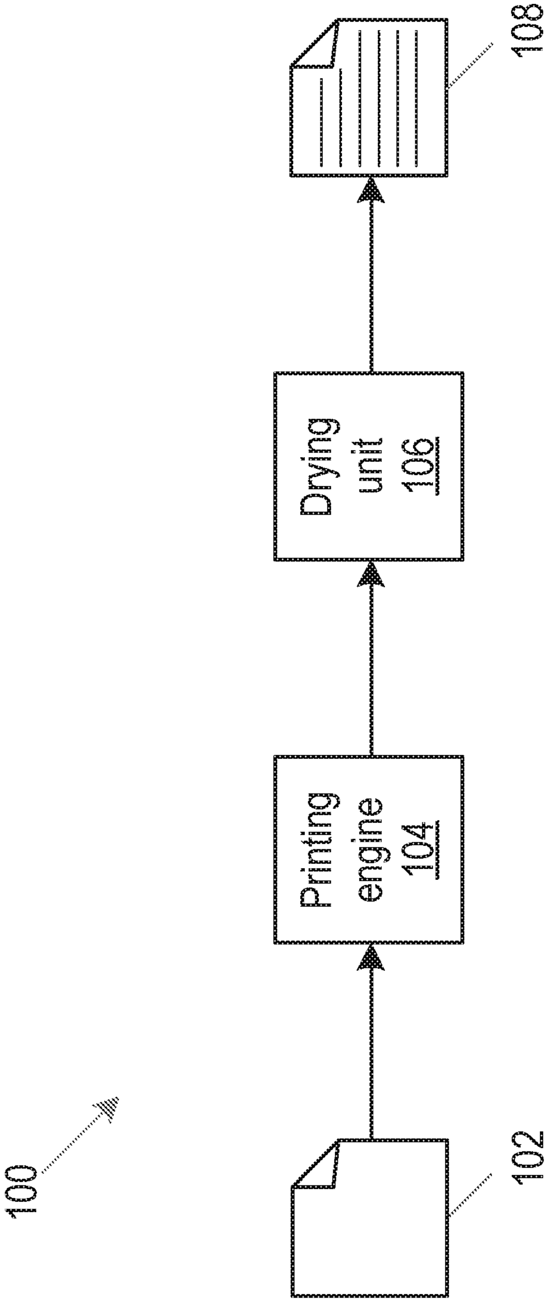
FIG. 1 is a schematic illustration of an example of a printing process.

FIG. 1 shows, schematically, an example of a printing process 100. A substrate 102 may comprise a web or a sheet of printable medium onto which print agent, such as printer ink, is to be deposited to form an image (e.g. text and/or images). The substrate 102 may comprise any medium onto which agent may be deposited including, for example, paper, cardboard, plastics or fabric. In examples disclosed herein, the substrate may comprise an absorbent material capable of absorbing a portion of the print agent deposited thereon.

The substrate 102 is transported (e.g. using a conveyor, such as a moving belt, not shown in FIG. 1) towards a print apparatus, or printing press. The substrate 102 is first fed to a printing engine 104 to be printed. The printing engine 104 may for example, comprise one or more print heads to deposit print agent onto the substrate 102. In some examples, a print head may include one or more nozzles through which print agent may be deposited during the printing process. In examples in which the substrate 102 comprises a web (e.g. a roll paper or cardboard), the printing engine 104 may be caused to print continuously as the web is moved beneath the printing engine. In other examples, the substrate 102 may comprise individual sheets of a plurality of sheets, which may be fed towards the printing engine 104 from a stack for printing, and removed once printing on the substrate is complete.

The print agent deposited on the print substrate 102 by the printing engine 104 may include any type of printing fluid, such as printer ink, capable of forming a pattern on the substrate. In some examples, the print agent may include a colorant, water and/or a solvent, such as a non-volatile solvent. The colorant may comprise a portion of the print agent that, and solidifies on, the surface of a printed substrate, and may include a pigment and a binder. Other components may be present in water-based or solvent-based printing fluids including, for example, surfactants, buffers, biocides, viscosity modifiers, and stabilising agents. As used herein, the term "non-volatile solvent" is intended to mean a non-acquiesce solvent with a boiling point over 200° C. A solvent-based print agent may include an organic solvent as a dispersing medium. In some examples, a solvent-based print agent may include a low molecular alcohol as a dispersing medium. In some examples, the solvent may be a mild biodegradable eco-solvent.

Once print agent has been printed onto the substrate 102, the printed substrate is conveyed towards a drying unit 106. The drying unit 106, which is discussed in greater detail below, is to dry the print agent that has been deposited onto the substrate 102. Once the print agent has been dried, a printed substrate 108 may be conveyed from the drying unit 106. A web substrate may be rolled or cut, and a sheet substrate may be transferred to an output stack, for example.

Figure 2:
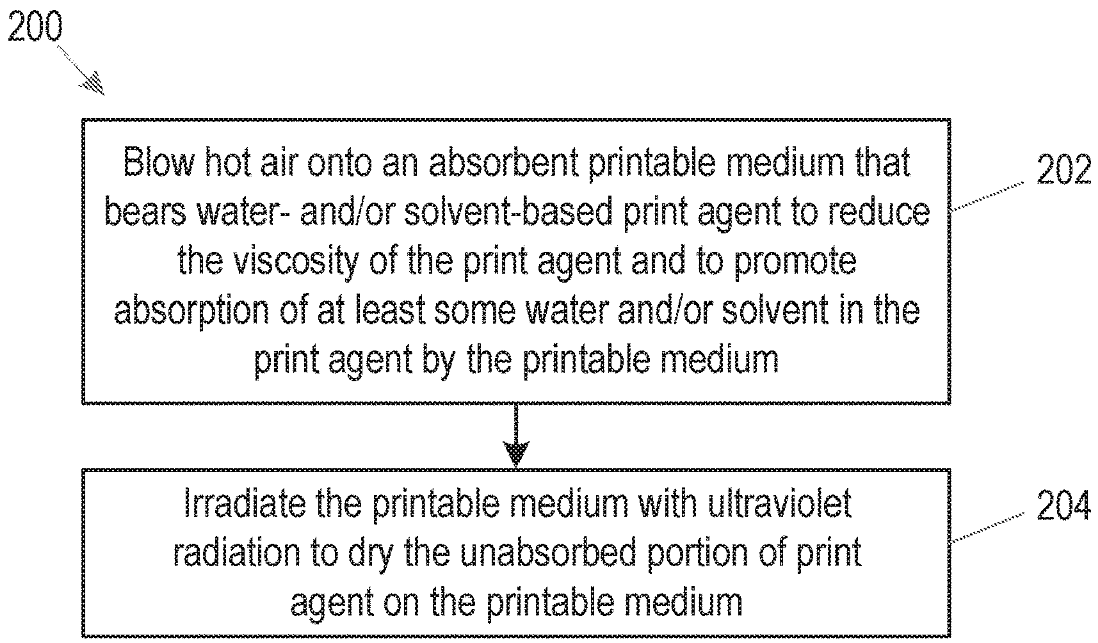
FIG. 2 is a flowchart of an example of a method of drying print agent.

Examples of methods of the print agent that has been printed onto a printable substrate will now be described with reference to FIGS. 2 and 3. FIG. 2 is a flowchart of an example of a method 200 of drying print agent. Examples, the method 200 may be performed using the drying unit 106 discussed above. The method 200 comprises, at block 202, blowing hot air onto an absorbent printable medium that bears water- and/or solvent-based print agent to reduce the viscosity of the print agent and to promote absorption of at least some water and/or solvent in the print agent by the printable medium. As used herein, the term "hot air" is intended to mean air that is at a temperature higher than the ambient air temperature. Subsequent to the blowing of hot air (i.e. after block 202), the method 200 comprises, at block 204, irradiating the printable medium with ultraviolet radiation to dry the unabsorbed portion of print agent on the printable medium. In some examples, irradiating the printable medium may comprise emitting ultraviolet radiation from an array of ultraviolet light emitting diodes.

The hot air may be blown onto the printable medium by a hot air blower (also referred to as a convection dryer or convection heater) of the drying unit 106. The hot air causes the temperature of the print agent on the printable medium to increase which, in turn, reduces the viscosity of the print agent. Since the print agent is water-based and/or solvent-based, some of the print agent (e.g. some water and/or some solvent) will naturally be absorbed by the absorbent printable medium. However, with the viscosity of the print agent reduced, the print agent (or a portion thereof) can be more readily absorbed by the absorbent printable medium. Furthermore, when the viscosity of the print agent is reduced, drops of print agent tend to spread more readily to form larger spots on the printable medium. Consequently, the thickness of the later of print agent formed on the printable medium is reduced. Thus, absorbent printable medium may also promote spreading of the print agent on the printable medium. When print agent is absorbed into the printable medium, the amount of print agent remaining on the surface of the printable medium is reduced and, therefore, the remaining (i.e. unabsorbed) print agent can be dried more quickly. Reducing the viscosity of the print agent to promote the absorption of the print agent (specifically, absorption of the water and/or the solvent of the print agent) by the printable medium may be referred to as “flushing”. In some examples, the print agent may comprise around 80% water and may comprise around 2% to 20% solvent, and this water and/or solvent may be removed from the print agent (e.g. by absorption into the printable medium and/or to a lesser extent by evaporation) during the drying process.

In some examples, the absorbent printable medium may comprise cardboard or paper. In some examples, the absorbent printable medium may be used to form a net of a foldable carton or container. Water and/or solvent in print agent may be absorbed into cavities or pores, or by fibers within the cardboard or paper.

The temperature of the print agent on the printable medium is to be increased sufficiently to increase the absorption of water and/or solvent in the print agent into the printable medium, but not so much that water or solvent in the print agent is caused to evaporate. Thus, in some examples, a temperature of the hot air is selected or controlled such that water and/or solvent in the print agent is not readily evaporated before it is absorbed into the printable medium. While some evaporation of water and/or solvent in the print agent will occur naturally, it is intended that the hot air blown onto the printable medium does not cause a substantial increase in the amount of water and/or solvent evaporated from the print agent. Thus, it is intended that the hot air blown onto the printable medium does not cause the temperature of the print agent to exceed 100° C. (degrees centigrade). In some examples, blowing hot air (block 202) may comprise applying air having a temperature of between around 40° C. and around 100° C. Air having a temperature within this range may increase the temperature of the print agent sufficiently to promote absorption of water and/or solvent in the print agent by the printable medium but not enough to cause significant evaporation of the water and/or solvent from the print agent. In some examples, the hot air blown onto the absorbent printable medium may have a temperature of between around 50° C. and around 80° C. In a particular example, the hot air blown onto the absorbent printable medium may have a temperature of between around 50° C. and around 60° C.

Another factor that may be taken into account when controlling the hot air to be blown onto the printable medium is the velocity at which the hot air is blown onto the medium. If the hot air is blown that too low a velocity, then it may not reach the substrate 102 from the drying unit 106. However, if hot air is blown at too high a velocity, then the flow of air may cause print agent to be displaced on the surface of the printable medium. Displacement of the print agent may cause an uneven or non-uniform formation of print agent, which may have an adverse effect on print quality. For example, if the hot air is blown onto the printable medium with too much force, then the print agent formed on the printable medium may be left with an unsmooth appearance. In some examples, blowing hot air may comprise blowing air at a velocity of between around 1 m/s (metres per second) and around 35 m/s. In a particular example, blowing hot air may comprise blowing air at a velocity of between around 1 m/s (metres per second) and around 25 m/s.

The temperature of the hot air and/or velocity at which the hot air is blown onto the printable medium may be controlled using a control unit which may, for example, be implemented using a processor or processing circuitry (not shown). For example, the control unit may form part of a print apparatus associated with the drying unit 106.

In some examples, the hot air may be blown onto the absorbent printable medium from above (i.e. from the side of the printable medium onto which the print agent has been printed) while, in other examples, the hot air may be blown onto the absorbent printable medium from below or underneath (i.e. from the side of the printable medium opposite to the side onto which print agent has been applied). In some examples, hot air may be blown onto both sides of the printable medium. The hot air may be blown directly onto the printable medium at an angle of incidence of or around 90° relative to the surface of the printable medium (i.e. normal to the surface of the printable medium). In other examples, the hot air may be blown over the surface of the printable medium such that the flow of air is approximately parallel to the surface of the printable medium. The hot air may, in other examples, be blown towards the printable medium at other angles of incidence.

Once the print agent on the absorbent printable medium has been heated by the hot air, some of the water and/or solvent in the print agent will be absorbed into the absorbent printable medium due to the “flushing” process discussed above, leaving unabsorbed print agent having a relatively lower proportion of water and/or solvent. When the unabsorbed print agent starts to dry, for example as a result of being heated gently by the hot air, it may start to solidify. Solidification of the print agent involves the formation of a film or barrier (also referred to as a film layer) on its uppermost surface. To achieve high a print quality, it is intended that the film layer remains intact during the drying process. By limiting the temperature of the hot air (and therefore limiting the temperature that the water and/or solvent in the print agent is able to reach) as discussed above, it is possible to prevent significant and rapid evaporation of water and/or solvent from the print agent which might damage or break the film layer. Similarly, by limiting the velocity of the hot air blowing onto the printable medium, is possible to prevent the film layer breaking as a result of the impinging airflow.

At block 204 of the method 200, the printable medium is irradiated with ultraviolet radiation. The ultraviolet radiation is absorbed by pigment or dye in the print agent. The irradiation of the printable medium causes the unabsorbed portion of print agent to be dried further. The color of print agent depends on the colorant/pigment used therein, and different pigments absorb radiation of different wavelengths to different extents. However, ultraviolet radiation is absorbed well by all pigments. Therefore, by irradiating the printable medium with ultraviolet radiation, the radiation may be absorbed by print agent of different colors. In other examples, the printable medium may be irradiated by radiation falling outside the ultraviolet range of the spectrum. For example, an energy or radiation source such as an infrared (IR) lamp or LED or a visible light (e.g. a visible LED) may be used to emit IR or visible radiation towards the print agent and/or the printable medium to dry the unabsorbed print agent.

Since some of the water and/or solvent in the print agent has been absorbed into the printable medium prior to the irradiation with ultraviolet radiation, the unabsorbed print agent contains relatively little water and/or solvent. Therefore, the unabsorbed print agent may be dried by the ultraviolet radiation in less time than if hot air had not been blown onto the print agent prior to irradiation. Therefore, drying the unabsorbed portion of print agent using ultraviolet radiation may be achieved using relatively little power, and the irradiation may be performed over a relatively short time, as compared to other techniques.

In some examples, as noted above, the print agent may comprise both water and a solvent (sometimes referred to as a co-solvent). The inclusion of a solvent may help to prevent the print agent from drying out before it is deposited onto the printable medium. In such examples, the blowing of hot air onto the absorbent printable medium (block 202) may also cause at least some solvent and some water to be absorbed into the printable medium. Thus, as a result of the reduced viscosity of the print agent, water and/or solvent in the print agent may be absorbed by the absorbent printable medium. Following the blowing of hot air onto the printable medium, the unabsorbed portion of print agent includes a low concentration of water and solvent, as much of the water and solvent is absorbed into the printable medium. Due to the reduced concentration of water and solvent in the print agent, drying of the unabsorbed portion of print agent may be achieved using less heating by the ultraviolet radiation.

Figure 3:
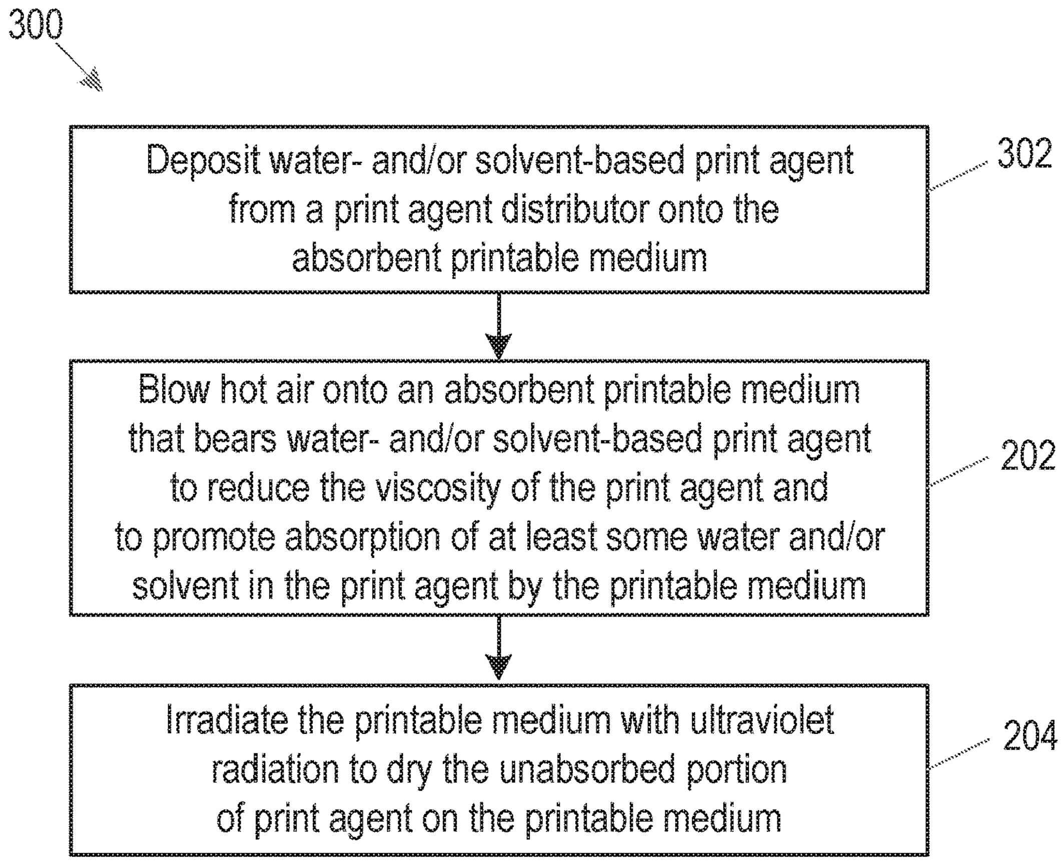
FIG. 3 is a flowchart of a further example of a method of drying print agent.

FIG. 3 is a flowchart of a further example of a method 300 of drying print agent. The method 300 may include blocks of the method 200 discussed above. The method 300 may further comprise, prior to the blowing of hot air (block 202 of FIG. 2), depositing water- and/or solvent based print agent from a print agent distributor onto the absorbent printable medium. The print agent distributor may comprise a print head of the printing engine 104.

Figure 4:
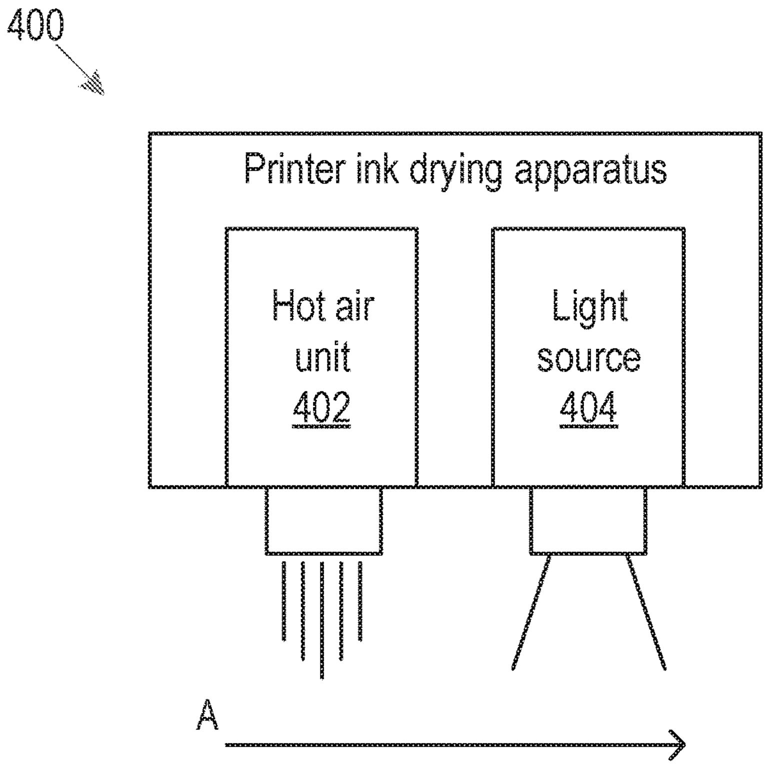
FIG. 4 is a schematic illustration of an example of an apparatus to dry printer ink.

FIG. 4 is a schematic illustration of an example of an apparatus 400 for drying printer ink. The printer ink drying apparatus 400 comprises a hot air unit 402 and a light source 404. The light source 404 may be referred to more generally as an energy source. The hot air unit 402 is to direct hot air onto printer ink that has been deposited onto a substrate, the printer ink comprising at least water and/or a solvent, and a colorant. The hot air unit 402 is to direct hot air to heat up the printer ink, to thereby flush at least a portion of the water and/or the solvent into the substrate. As discussed above, the water and/or solvent are "flushed" into the substrate through absorption. The absorption effect is increased as a result of the viscosity of the printer ink having been reduced by the increase in temperature.

The light source 404 is to emit ultraviolet (UV) light towards the printer ink on the substrate. The UV light emitted by the light source 404 helps to dry the unabsorbed printer ink remaining on the substrate (i.e. the portion of the printer ink that is not flushed into the substrate).

In some examples, the substrate may be transported or conveyed past or through the apparatus 400 in a direction indicated by the arrow A, for example by conveyor or moving belt. For example, the substrate may be conveyed from a position under the hot air unit 402 to the light source 404. Thus, the light source 404 is located downstream of the hot air unit 402 in a direction of advancement of the substrate. In other words, as the substrate advances in the direction A, it first encounters the hot air unit 402 and then the light source 404. In this way, printer ink on the substrate may first be heated by hot air from the hot air unit 402, such that water and/or solvent absorbed into the substrate, then the unabsorbed portion of printer ink may be heated and dried quickly and efficiently by the ultraviolet light from the light source 404.

The hot air unit 402 may, in some examples, be to direct air of a temperature high enough to reduce the viscosity of the printer ink, and low enough that water and solvent is not caused to evaporate. Thus, while some evaporation of water and/or solvent in the printer ink will occur naturally, even without the application of additional heat from the hot air unit 402, it is intended that significant evaporation of water and/or solvent resulting from the increase in temperature by the hot air is avoided.

To achieve the intended absorption of water and/or solvent, without the unintended evaporation of water and/or solvent from the printer ink, the hot air unit 402 may be controlled to direct air having a particular temperature, or falling within a particular range of temperatures, and/or at a particular velocity, or falling within a particular range of velocities. In one example, the hot air unit 402 may direct air having a temperature of between around 40° C. and around 100° C., and at a velocity of between around 1 m/s and around 35 m/s. In some examples, the hot air unit may direct air having temperature of between around 50° C. and around 80° C. In a particular example, the hot air unit may direct air having a temperature of between around 50° C. and around 60° C. and/or at a velocity of between around 1 m/s and around 25 m/s.

The light source 404 may, in some examples, comprise an ultraviolet light emitting diode (LED), for example a 300 nm LED, a 375 nm LED, a 395 nm LED or a 410 nm LED. In some examples, the light source 404 may comprise an array of ultraviolet LEDs. In other examples, the light source 404 may comprise, for example, a laser diode or other laser device. In some examples, the light source emits light in a relatively narrow band (for example, having a bandwidth of around 20-30 nm) in the UV range, for example having a central frequency between 200-400 nm.

Figure 5:
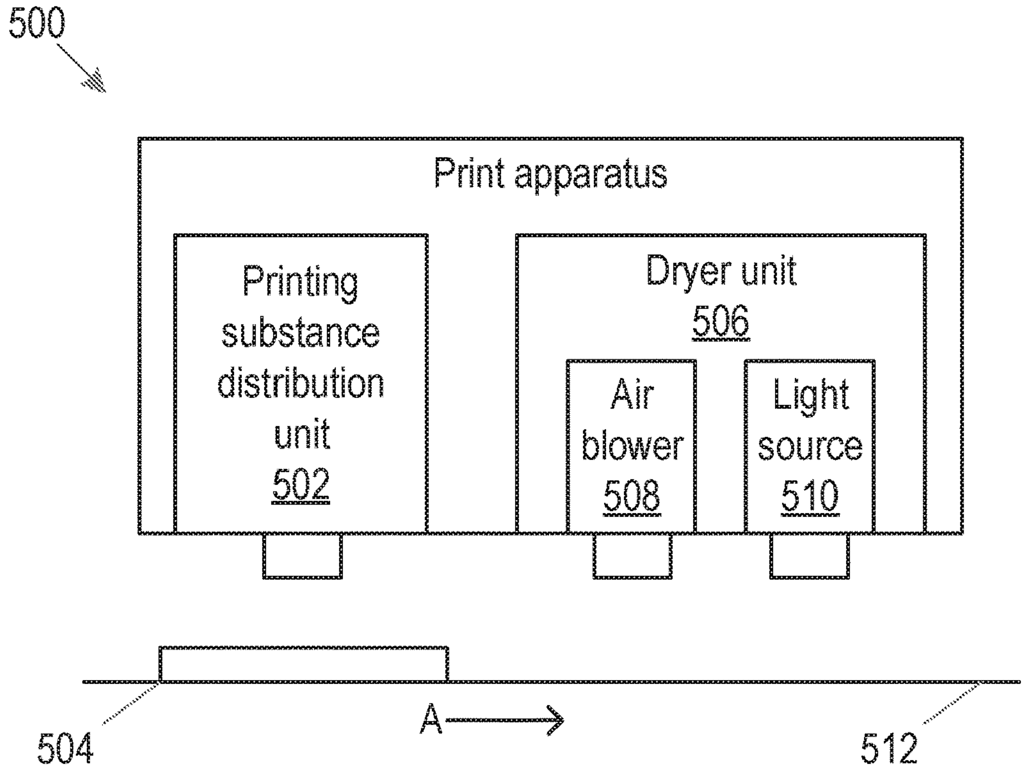
FIG. 5 is a schematic illustration of an example of a print apparatus.

The printer ink drying apparatus 400 may be associated with, or form part of, a print apparatus, such as a printing press. FIG. 5 is a schematic illustration of an example of print apparatus 500. The print apparatus 500 comprises a printing substance distribution unit 502 to deposit water- and/or solvent-based printing substance comprising water and/or a solvent, and a colorant onto an absorbent substrate 504. The printing substance distribution unit 502 may, in some examples, comprise the printing engine (104; FIG. 1). The print apparatus 500 also comprises a dryer unit 506 which may, for example, comprise the drying unit (106; FIG. 1). The dryer unit 506 comprises an air blower 508 and a light source 510. The air blower 508 may comprise or be similar to the hot air unit (402; FIG. 4), and the light source 510 may comprise or be similar to the light source (404; FIG. 4). The air blower 508 is to blow air onto the printing substance, to cause a portion of the water and/or the solvent to be absorbed into the absorbent substrate 504. The light source 510 is to emit ultraviolet radiation towards the absorbent substrate 504, to dry and unabsorbed portion of the printing substance. The light source by 510 is located downstream of the air blower 508 in a direction of advancement of the absorbent substrate 504. For example, in FIG. 5, the absorbent substrate 504 may be transported or conveyed (e.g. via a moving belt or conveyor 512) under or through the print apparatus 500 in the direction A, such that the absorbent substrate first encounters the printing substance distribution unit 502, then the air blower 508 and the light source 510 of the dryer unit 506.

The light source 510 may, in some examples, emit radiation having a wavelength of between around 200 nm and around 450 nm. Such wavelengths are generally within the ultraviolet range. The light source 510 may, for example, comprise a UV LED or an array of UV LEDs.

In some examples, the print apparatus 500 may comprise an ink jet printer. In other examples, the print apparatus 500 may comprise a xerographic printer, an offset printer, a flexo printer, a gravure printer, or any other digital or analogue printer.

The printing substance distribution unit 502 may dispense at least one liquid printing substance comprising a colorant (e.g. a pigment or dye). In one example, the printing substance distribution unit 502 is to dispense cyan C, magenta M, yellow Y and black K colorants dissolved or suspended in water.

Some examples of colorants which may be used with the methods and apparatus described herein are now discussed in greater detail. In general, the colorants may have any of a range of uses, for example comprising pigmented water- and/or solvent-based inks designed for a variety of substrates including paper, Latex inks, pigmented textile inks, LEP electroinks and Dye sublimation inks.

Colorants may comprise pigments, which may be dissolved or dispersed in a dispersing medium. Such colorants may be used as inks in inkjet printing processes.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "dispersing medium", refers to the medium (e.g. a fluid) in which resins, pigment particles, colorants, and/or other additives can be dispersed to form an ink. The dispersing medium may also be referred to as a carrier fluid. The dispersing medium may include a mixture of a variety of different agents, such as surfactants, co-solvents, viscosity modifiers, and/or other possible ingredients.

In some examples, the colorants may comprise water-insoluble dye from the class of dyes known as solvent, or disperse, dyes. These dyes are, in general, substantially insoluble in water and completely or partially soluble in organic solvents. A sub-class of solvent dyes is known as sublimation dyes. These dyes disintegrate and diffuse into the substrate at temperatures as low as about 200° C.

Sublimation colorants may comprise "dispersions" in which micro-particulate dye solids are suspended within a dispersant system which may contain water and a selected liquid or solid chemical dispersing medium. Many different commercially-available sublimation colorants may be employed in the methods and apparatus set out herein, which shall not be restricted to any particular ingredients for this purpose. For example, a first class of dye compositions consists of a group of materials known as "liquid colors", which basically involve sublimation coloring agents (in micro-particulate form) which are already suspended in a selected dispersant system. These "liquid color" materials typically contain about 50 to 80 wt % water, about 10 to 20 wt % of the coloring agent, about 5 to 10 wt % of the dispersant (either a solid or liquid type), and about 5 to 20 wt % of a humectant (for inhibiting water evaporation). Representative, non-limiting examples of these pre-manufactured, ready-to-use liquid color materials are commercially available from many sources including, but not limited to, BASF of Charlotte, N.C. under the trademark BAFIXAN. Examples of the coloring materials available from BASF include the following, with the C.I. (Color Index) name of the coloring agent in the composition being listed following the commercial name of the product: (1) BAFIXAN RED BF (C.I. Disperse Red 60); (2) BAFIXAN YELLOW 3GE (C.I. Disperse Yellow 54); (3) BAFIXAN BLUE R (C.I. Disperse Blue 326); and (4) BAFIXAN BLACK BN (a blend of C.I. Disperse Red 60, C.I. Disperse Yellow 54, and C.I. Disperse Blue 79). Many other formulations involving the above-listed and other C.I. sublimation dyes may also be employed in the methods and apparatus set out herein.

Another class of ink compositions containing one or more sublimation dye coloring agents which may be employed in the methods and apparatus set out herein involve solid dye materials (e.g., in powder form) that can be combined during ink formulation with a selected liquid or solid dispersing medium, water, and the like. Specifically, these materials do not involve "pre-manufactured" liquid dye compositions as previously described in connection with the "liquid colors" listed above. Instead, they are subsequently converted into a liquid dispersion (having similar ingredients and proportions as those designated above in connection with the "liquid colors") immediately before or during ink production. Representative, non-limiting examples of these solid dye compositions include the following, with the C.I. (Color Index) name of the coloring agent in the composition being followed by the commercial name of the product: (1) C.I. Disperse Blue 3 (Keystone Aniline, Chicago, Ill.—SUBLAPRINT BLUE 70014); (2) C.I. Disperse Blue 14 (Keystone Aniline, SUBLAPRINT BLUE 70013); (3) C.I. Disperse Blue 72 (Tricon Colors, Elmwood, N.J.); (4) C.I. Disperse Blue 359 (Crompton & Knowles, Charlotte, N.C.—INTRATHERM BLUE P-1305NT); (5) C.I. Disperse Red 60 (Crompton & Knowles—INTRATHERM BRILLIANT RED P1314NT); and (6) C.I. Disperse Yellow 54 (Crompton & Knowles—INTRATHERM YELLOW P343NT). Again, the present disclosure is not limited to any particular sublimation dye coloring agents and ink compositions containing the same, with the representative products listed above being provided for example purposes.

In both of the previously-described classes of dye compositions (i.e., "liquid colors" and solid colorant materials), at least one liquid or solid dispersing medium is employed. Many different dispersing mediums may be used for this purpose, including, but not limited to, acrylic polymers sold under the trademark JONCRYL by S. C. Johnson Co., Racine, Wis., condensed naphthalene sulfonates sold under the trademark LOMAR by the Henkel Co. of Kankakee, Ill., and sodium lignosulfonates sold by Lignotech, Rothschild, Wis. As noted above, the final liquid dye product (in completed dispersion form) in both classes may include about 50 to 80 wt % water, about 10 to 20 wt % dye, about 5 to 10 wt % dispersant, and about 5 to 20 wt % humectant. Representative humectants include 2-pyrrolidone, 1,5-pentanediol, diethylene glycol, and 2-ethyl-2-hydroxymethyl-1,3-propanediol. However, these values and materials may be varied in accordance with the particular dye compounds under consideration and other factors. The completed ink composition may contain about 0.1 to 12.5 wt % completed dispersion containing the selected sublimation dye coloring agent (e.g., the selected dye plus dispersant materials in combination).

In examples, the colorant(s) may comprise an LEP ink (pigmented LEP ink) including a dye or pigment. The dye or pigment can be any colorant compatible with the liquid carrier and useful for electrophotographic printing. For example, the dye or pigment may be present as pigment particles or may comprise a resin and a pigment. The resins and pigments can be any of those typically used in the art. In some examples, the pigment is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; STERLING® NSX 76, MOGUL® L; pigments by DuPont including TIPURE® R-101. Where the pigment is a white pigment particle, the pigment particle may be selected from the group consisting of $TiO_2$, calcium carbonate, zinc oxide, and mixtures thereof. In some examples the white pigment particle may comprise an alumina-$TiO_2$ pigment.

The pigment particle may be present in the LEP ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the pigment particle may be present in the LEP ink in an amount of at least 50 wt % of the total amount of resin and colorant or pigment, for example at least 55 wt % of the total amount of resin and pigment.

Examples of the LEP ink(s) include any commercially available LEP ink (e.g., ElectroInk available from HP Indigo).

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of drying print agent, the method comprising:

blowing hot air onto an absorbent printable medium that bears water- and/or solvent-based print agent to reduce the viscosity of the print agent and to promote absorption of at least some water and/or solvent in the print agent by the printable medium, wherein the hot air heats the water- and/or solvent-based print agent without causing evaporation of the water- and/or solvent-based print agent, wherein the water- and/or solvent-based print agent is non-curable; and subsequent to the blowing of hot air, drying the unabsorbed portion of the water- and/or solvent-based print agent on the printable medium by irradiating the printable medium with ultraviolet radiation.

2. A method according to claim 1, further comprising, prior to said blowing:

depositing water- and/or solvent-based print agent from a print agent distributor onto the absorbent printable medium.

3. A method according to claim 1, wherein a temperature of the hot air is selected or controlled such that water and/or solvent in the print agent is not readily evaporated before it is absorbed into the printable medium.

4. A method according to claim 1, wherein blowing hot air comprises blowing air having a temperature of between around 40 degrees centigrade and around 100 degrees centigrade.

5. A method according to claim 1, wherein blowing hot air comprises blowing air having a temperature of between around 50 degrees centigrade and around 80 degrees centigrade.

6. A method according to claim 1, wherein blowing hot air comprises blowing air at a velocity of between around 1 metre per second and around 35 metres per second.

7. A method according to claim 1, wherein the absorbent printable medium comprises cardboard or paper.

8. A method according to claim 1, wherein irradiating the printable medium comprises emitting ultraviolet radiation from an array of ultraviolet light emitting diodes.

9. A printer ink drying apparatus to dry printer ink, the printer ink drying apparatus comprising:

printer ink, wherein the printer ink is non-curable and comprises at least water and/or a solvent, and a colorant;

a hot air unit to direct hot air onto the printer ink that has been deposited onto a substrate, wherein the hot air unit is to direct hot air to heat up the printer ink, to thereby flush at least a portion of the water and/or the solvent into the substrate; and a light source to emit ultraviolet light towards the printer ink on the substrate;

wherein the light source is located downstream of the hot air unit in a direction of advancement of the substrate.

10. A printer ink drying apparatus according to claim 9, wherein the hot air unit is to direct air of a temperature high enough to reduce a viscosity of the printer ink, and low enough that water and solvent is not caused to evaporate.

11. A printer ink drying apparatus according to claim 9, wherein the hot air unit is to direct air having a temperature of between around 40 degrees centigrade and around 100 degrees centigrade, and at a velocity of between around 1 metre per second and around 35 metres per second.

12. A printer ink drying apparatus according to claim 9, wherein the light source comprises an array of ultraviolet light emitting diodes.

13. A print apparatus comprising:

a printing substance distribution unit storing a non-curable solvent-based printing substance comprising water and/or a solvent, and a colorant onto an absorbent substrate; and a dryer unit comprising:

an air blower to blow air onto the printing substance, to cause a portion of the water and/or the solvent to be absorbed into the absorbent substrate, wherein the air blower heats the water- and/or solvent without causing evaporation of the water- and/or solvent; and a light source to emit ultraviolet radiation towards the absorbent substrate, to dry an unabsorbed portion of the printing substance;

wherein the light source is located downstream of the air blower in a direction of advancement of the absorbent substrate.

14. A print apparatus according to claim 13, which comprises an inkjet print apparatus.

15. A print apparatus according to claim 13, wherein the light source is to emit radiation having a wavelength of between around 200 nm and around 450 nm.

* * * * *